United States Patent [19]

Bustin

[11] 4,102,432

[45] Jul. 25, 1978

[54] STEP MOUNTING STRUCTURE FOR VEHICLE TANKS

[76] Inventor: Leopold Bustin, Emmans Rd., Flanders, N.J. 07836

[21] Appl. No.: 767,688

[22] Filed: Feb. 11, 1977

[51] Int. Cl.$^2$ .............................................. B60R 3/00
[52] U.S. Cl. ...................................... 182/92; 280/163
[58] Field of Search ................... 182/92, 90, 129, 228; 280/163, 164 R, 165, 169

[56] References Cited

FOREIGN PATENT DOCUMENTS 479,633  12/1951  Canada .................................. 182/92

Primary Examiner—Reinaldo P. Machado
Attorney, Agent, or Firm—Carella, Bain, Gilfillan & Rhodes

[57] ABSTRACT

A step for mounting on tank structure which is supported by straps is disclosed to include bracing structure and bearing plates provided with dimples. The bearing plate dimples cooperate with dimples formed in the tank support straps to maintain the position of the step with respect to the tank in a rigid position and substantially incapable of relative motion thereto.

4 Claims, 5 Drawing Figures

STEP MOUNTING STRUCTURE FOR VEHICLE TANKS

BACKGROUND OF THE INVENTION

This invention relates to motor vehicles, and in particular trucks. More specifically, this invention relates to mounting structure for mounting a step on the tank of a truck e.g. a gas tank.

As is well known by those having skill in these arts, truck fuel tanks are often mounted on the frame of the truck slightly to the rear of the cab. Mounting ordinarily is achieved by two, three or more straps which are bolted to the frame and which wrap around the tank to hold it rigidly in position.

It has often been deemed desirable to mount one or more steps on a vehicle tank. Such steps are utilized to gain access to the operational equipment mounted on the back wall of the cab and in particular the equipment which is connectable to the trailer.

The usual mode of mounting steps in the past has been to provide a plate or other clamping device between the support strap and the material of the tank itself. Such structure has been found to be unsatisfactory, however, because the tank support straps tend to become loose with use and as a result the step will tend to slide between the strap and the tank thus creating a hazard when mounted by an individual.

In order to overcome this problem, it has been proposed that holes be drilled in the strap mechanism and that support bracing elements be provided to extend downwardly from the step and underneath the fuel tank to the frame. Such installation involving drilling, positioning, bolting, construction of bracing and the like is obviously expensive and complex. All of this is particularly true when it is desired to retrofit a step on an existing strap supported tank.

It will also be recognized by those skilled in these arts that the most expedient way to mount such a step would be welding. However, it is well recognized that various codes preclude welding on tanks such as gasoline tanks and that even where appropriate precautionary measures are taken such practices are frowned upon because of the inherent weakening and possible damage to the relatively thin tank wall as a result of the welding activities.

It will also be recognized by those skilled in these arts that in the absence of a secure structural relationship between the step and the tank supporting the structure, ordinary vibration experienced in the operation of the vehicle may well cause the securing means to become loosened. In this regard, there has occurred injury resulting from an individual seeking support on a tank mounted step and the step sliding under the load of the individual thus causing the individual to fall, on occasion into on-coming traffic. Accordingly, the improvement of the structural relationship between a step and a tank is of paramount interest to those concerned with driver safety and overall vehicular safety.

SUMMARY OF THE INVENTION

It is an object of the present invention, therefore, to provide structure for mounting a step on a strap supported tank which is precluded from sliding with respect to the strap and the tank while in mounted position.

A further object of the present invention is to provide mounting structure for a step to be mounted on a strap supported tank which is retained in position notwithstanding the ordinary lossening of the strap supports experienced during normal operations.

A still further object of the present invention is to provide a rigidly positioned step for strap supported tank structure which step is adapted for simple utilization with existing strap supported tank structure.

Yet another object of the present invention is to provide a step mounting structure for strap supported tanks which is economical to manufacture, easy to install and highly reliable.

These objects and others not enumerated are achieved by the step supporting structure according to the present invention one embodiment of which may include mounting means rigidly secured to the step structure, the mounting means being contoured to correspond to the contour of the tank on which the step is to be mounted and the mounting means having at least one dimple associated therewith which is adapted for registration with a corresponding dimple formed in the strap on the strap support for the tank.

BRIEF DESCRIPTION OF THE DRAWINGS

A more complete understanding of the present invention may be had from the following detailed description thereof, particularly when read in the light of the accompanying drawings wherein.

DETAILED DESCRIPTION

Figure 1:
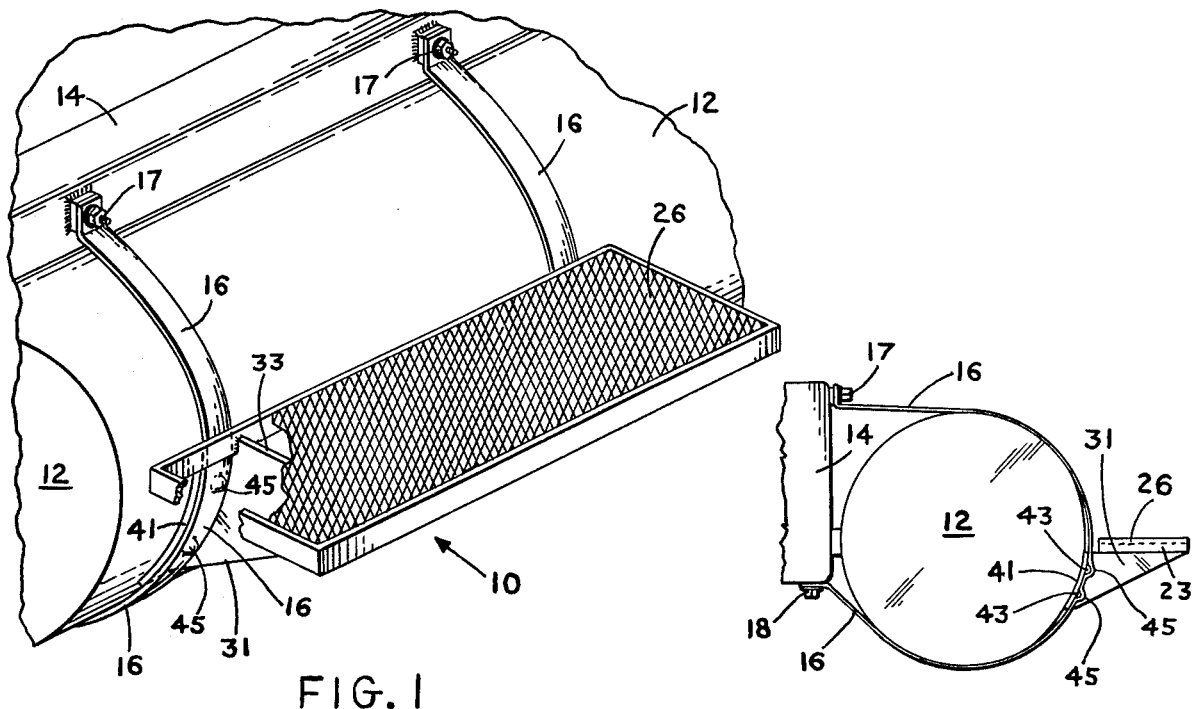
FIG. 1 is a perspective view of a supporting member from which a tank is hung by supporting strap and on which is mounted a step structure in accordance with the present invention.

As noted above this invention relates to step structure for use in conjunction with strap supported tanks. Thus, a step structure designated generally by the reference numeral 10 is shown in FIG. 1 mounted on a strap supported tank 12.

Figure 2:
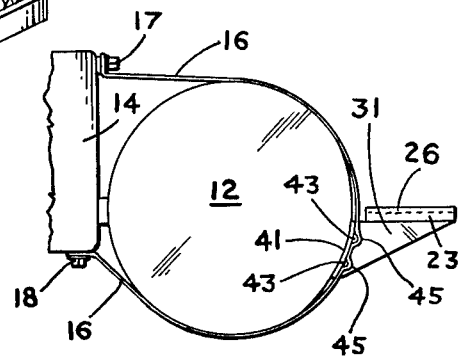
FIG. 2 is an end view of the structure of FIG. 1.

More specifically, there is shown in FIGS. 1 and 2 a structural element 14 which may be, for example, a portion of the chassis of a truck. Supported by structural element 14 is tank 12 which may be a gas tank, fuel tank or other tank. In the embodiment shown tank 12 is generally cylindrical in shape, however, the step of the present invention may be utilized with tanks which are other than cylindrical in shape.

Tank 12 is rigidly secured to structural element 14 by a pair of straps 16 opposed ends 17, 18 of which are secured to structural element 14 in a conventional manner.

Figure 3:
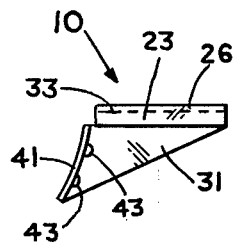
FIG. 3 is an end elevational view of step structure in accordance with the invention.
Figure 4:
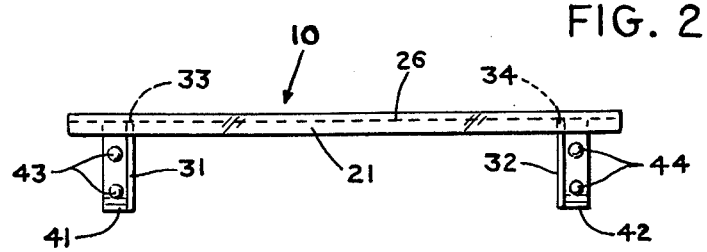
FIG. 4 is a front elevational view of step structure in accordance with the invention.
Figure 5:
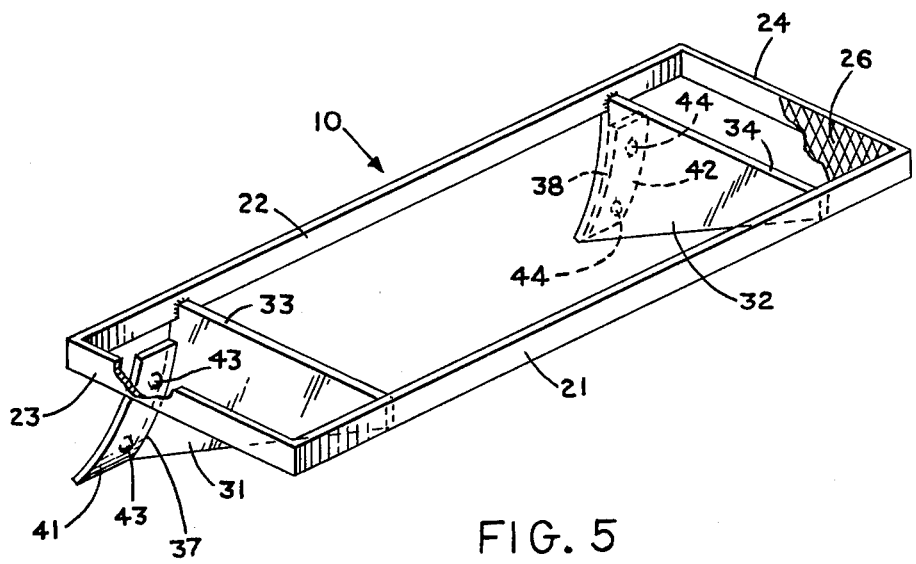
FIG. 5 is a perspective view of step structure in accordance with the present invention, the portion of the grating being cut away.

Referring therefore to FIGS. 3, 4 and 5, there are shown side, front and perspective views of a step structure according to the invention. Step structure 10 includes a frame 20 having a front element 21, a rear element 22 and side elements 23 and 24. Retained within frame 20 such as by welding is a grating 26 which may be any one of many generally known and available in the art. The present invention, however, does not pertain to particular grating structure. Accordingly, in FIG. 5, a major portion of the showing of grating 26 has been cut-away to provide a more detailed showing of the step support structure.

Considering the step support, therefore, there are provided a pair of brace means 31 and 32. Brace means 31 and 32 are welded at their front ends to front element 21 of frame element 20 and at their rear ends to rear element 22 of frame 20. The upper edges 33, 34 of brace means 31, 32 are positioned to be in engagement with the lower surface of grating 26. Further, the planes of brace means 31 and 32 are substantially parallel and extend normally to the plane of grating 26.

Brace means 31 and 32 are formed with inner edges 37, 38 which are curvilinear. The curve form of inner edges 37, 38 corresponds to the curvature of the surface of tank 12. Extending outwardly from brace means 31 and 32 along edges 37 and 38 are bearing plates 41, 42. Bearing plates 41 and 42 are integral with brace means 31, 32 or rigidly secured to brace means 31, 32 such as by welding along edges 37, 38.

Bearing plates 41, 42 are curved to correspond to the curvature of tank 12 in order to be in surface to surface engagement with tank 12 when step 10 is mounted thereon. Referring to FIGS. 4 and 5, it can be seen that bearing plate 41 extends outwardly i.e. to the left of brace means 31 and that bearing plate 42 extends outwardly i.e. to the right from brace means 32. This extension in opposed directions is to permit the bearing plates to be received under straps 16 in such a manner as to preclude transverse i.e. left to right or right to left movement between the tank and the step when the step is mounted thereon.

It is also evident from the drawings that bearing plate 41 is provided with a pair of dimples 43 which extend outwardly thereof i.e. in the direction away from tank 12 when step 10 is in the mounted position. Similarly, bearing plate 42 is provided with a pair of dimples 44 which also extend outwardly from the bearing plate surface i.e. away from tank 12 when step 10 is in the assembled position. Dimples 43 and 44 are structured to cooperate with two pairs of corresponding dimples 45 and 46 formed in straps 16. More particularly, dimples 43 and 44, when step 10 is mounted on tank 12 are received within dimples 45 and 46 respectively. With dimples so received or positioned to be received within the dimples on the straps, straps 16 are tightened thus securing bearing plates 41 and 42 between the inner surfaces and straps 16 and the external surface of tank 12. With the bearing plates so secured and dimples 43 and 44 positioned within dimples 45 and 46, respectively, step 10 is securely received and maintained in position with respect to tank 12 and the cooperative dimples preclude relative motion between the step and the tank.

The step structure can be manufactured using conventional means, all of which are well-known to those skilled in these arts. Further, the dimples in both the straps and the bearing plates can be provided by well-known mechanical apparatus. It is only necessary that care be taken to locate the dimples on the straps in such a manner as to insure registration with dimples on the bearing plates and leveling of the step in the assembled position.

Generally accepted materials may be utilized for manufacturing step 10. Clearly materials such as generally known steels, aluminum and the like are appropriate for such structure.

It can be seen, therefore, that the step structure 10 is a structure which may be manufactured with a minimum of effort and expense, may be installed without the need for expensive tooling and does not require any welding on a tank such as tank 12 which is provided for carrying fuels and the like. In this regard the ability to eliminate the need for welding, the need for previously utilized expensive structural supports or the need for expensive tooling constitutes a significant step forward and economic improvement in the structure of tank mounted steps.

It will also be recognized by those skilled in the arts that many modifications and variations to the basic structure of the disclosed preferred embodiment may be made without departing from the spirit and scope of the invention.

What is claimed is:

1. A step for mounting on a strap supported tank comprising:
    step means;
    at least one bearing plate, said bearing plate defining a plane which corresponds in shape to the surface of said tank, and at least one dimple formed in said bearing plate; and
    brace means for rigidly securing said step means to said bearing plate, said bearing plate being shaped to be received between said tank and said strap for supporting said tank, said bearing plate being shaped to be in surface-to-surface contact with said tank and said strap.

2. A step according to claim 1 including a dimple formed in said strap and wherein said dimple formed in said bearing plate cooperates with said dimple in said strap to preclude relative movement between said bearing plate and said strap.

3. A step according to claim 2 wherein there are a plurality of straps for supporting said tank and further including a plurality of bearing plates corresponding to the number of straps.

4. A step according to claim 3 wherein each strap is provided with a dimple and each bearing plate is provided with a dimple, each dimple on each bearing plate for cooperating with a dimple on a strap.

* * * * *